US012003828B1

(12) United States Patent  Kolodziej

(10) Patent No.: US 12,003,828 B1
(45) Date of Patent: Jun. 4, 2024

(54) METHOD AND SYSTEM FOR INDIVIDUALIZED CONTENT DATA FEEDS

(71) Applicant: Dawid Maj Kolodziej, Zug (CH)

(72) Inventor: Dawid Maj Kolodziej, Zug (CH)

( * ) Notice: Subject to any disclaimer, the term of this patent is extended or adjusted under 35 U.S.C. 154(b) by 0 days.

(21) Appl. No.: 18/356,132

(22) Filed: Jul. 20, 2023

Related U.S. Application Data

(60) Provisional application No. 63/484,489, filed on Feb. 11, 2023.

(30) Foreign Application Priority Data

Feb. 11, 2023 (CH) ................................ 000131/2023

(51) Int. Cl.
*H04N 21/81* (2011.01)
*H04N 21/43* (2011.01)
*H04N 21/45* (2011.01)

(52) U.S. Cl.
CPC ....... *H04N 21/812* (2013.01); *H04N 21/4307* (2013.01); *H04N 21/4532* (2013.01)

(58) Field of Classification Search
CPC ............. H04N 21/812; H04N 21/4307; H04N 21/4532
See application file for complete search history.

(56) References Cited

U.S. PATENT DOCUMENTS

| | | | | |
|---|---|---|---|---|
| 7,222,354 B1 * | 5/2007 | Ching | ................ | H04N 21/4532 725/35 |
| 7,360,230 B1 * | 4/2008 | Paz | .................... | H04N 7/17318 375/E7.254 |
| 7,925,549 B2 * | 4/2011 | Looney | .................. | G06Q 30/06 705/26.1 |
| 8,966,520 B2 * | 2/2015 | Tom | .................... | H04N 21/4532 725/35 |
| 9,380,326 B1 * | 6/2016 | Corley | .................... | H04L 65/75 |
| 9,846,883 B2 * | 12/2017 | Angell | ............... | G06Q 30/0271 |

(Continued)

FOREIGN PATENT DOCUMENTS

GB         2412802 A       10/2005

OTHER PUBLICATIONS

European Patent Office, "International Search Report and Written Opinion of the International Searching Authority", PCT Application No. PCT/IB2024/051197, Apr. 23, 2024, 16 pages.

*Primary Examiner* — Timothy R Newlin
(74) *Attorney, Agent, or Firm* — Patent GC LLC; Alexander Franco

(57) ABSTRACT

A system can be configured to generate customized content data suitable for marketing, advertising, or campaigns. The customized content data can be feedable or can be streamed to devices, such as end user devices. The customized content data can include a static content component, e.g., referring to a product, such as a car, or a service, and a dynamic content component, e.g., a product version, such as a color of the car. The customized content data can alternatively include a static content component and one or more dynamic content components, e.g., a music or music track selected to be combined with the static content component. Two or more components can be combined at the time of rendering the customized content data on an end-user device. The customized content data can also be generated for streaming or transferring to the end-user device.

15 Claims, 6 Drawing Sheets

(56) References Cited

U.S. PATENT DOCUMENTS

| | | | |
|---|---|---|---|
| 10,080,061 B1* | 9/2018 | Kirley | H04N 21/4852 |
| 10,489,496 B1* | 11/2019 | Sen | H04N 21/4122 |
| 11,012,757 B1* | 5/2021 | Nielsen | H04N 21/8106 |
| 2002/0013943 A1* | 1/2002 | Haberman | H04N 21/6408 |
| | | | 725/39 |
| 2003/0204844 A1* | 10/2003 | Brant | H04N 21/854 |
| | | | 725/35 |
| 2007/0079331 A1* | 4/2007 | Datta | H04N 21/47205 |
| | | | 725/23 |
| 2008/0263458 A1* | 10/2008 | Altberg | H04N 7/157 |
| | | | 370/352 |
| 2009/0037947 A1* | 2/2009 | Patil | H04N 21/812 |
| | | | 725/32 |
| 2009/0193466 A1* | 7/2009 | Ehreth | H04N 21/47202 |
| | | | 725/110 |
| 2010/0088716 A1* | 4/2010 | Ellanti | H04N 21/41415 |
| | | | 386/241 |
| 2010/0122285 A1* | 5/2010 | Begeja | H04N 21/439 |
| | | | 725/34 |
| 2010/0251289 A1* | 9/2010 | Agarwal | H04N 21/458 |
| | | | 725/34 |
| 2012/0253937 A1* | 10/2012 | Wing | H04N 21/2547 |
| | | | 705/14.66 |
| 2014/0039991 A1 | 2/2014 | Gates et al. | |
| 2014/0040946 A1* | 2/2014 | Gates, III | H04N 21/812 |
| | | | 725/34 |
| 2014/0068661 A1* | 3/2014 | Gates, III | H04N 21/44218 |
| | | | 725/34 |
| 2014/0157306 A1* | 6/2014 | Deo | H04N 21/812 |
| | | | 725/34 |
| 2015/0245084 A1* | 8/2015 | Downing | H04N 21/25883 |
| | | | 725/12 |
| 2018/0077467 A1* | 3/2018 | Novobilski | G06Q 30/02 |
| 2018/0376218 A1* | 12/2018 | Wu | H04N 21/4183 |
| 2019/0191205 A1* | 6/2019 | DeLorme | H04N 21/8547 |
| 2019/0354765 A1* | 11/2019 | Chan | H04N 21/2187 |
| 2020/0193163 A1* | 6/2020 | Chang | H04N 21/4662 |
| 2020/0272659 A1 | 8/2020 | Pachet et al. | |
| 2020/0314460 A1* | 10/2020 | Hu | H04N 21/2368 |
| 2021/0287244 A1* | 9/2021 | Bhole | H04N 21/8456 |
| 2021/0352379 A1* | 11/2021 | Black | H04N 21/42203 |
| 2022/0007065 A1* | 1/2022 | Facey | H04N 21/2387 |
| 2022/0272394 A1* | 8/2022 | Chandrashekar | H04L 65/612 |
| 2022/0417592 A1* | 12/2022 | Emmanuel | G06Q 30/0241 |
| 2023/0048162 A1* | 2/2023 | Brown | H04N 21/2187 |

* cited by examiner

METHOD AND SYSTEM FOR INDIVIDUALIZED CONTENT DATA FEEDS

RELATED APPLICATIONS

The subject matter of this application is related to U.S. Provisional Application No. 63/484,489, filed on 2023 Feb. 11, which is hereby incorporated by reference in its entirety.

BACKGROUND OF THE INVENTION

The demand for online worldwide services, e.g., in marketing, or new types of interactive products, has increased over the years. On one hand companies, content or product creators and owners are investing significantly more in digital marketing, new marketing solutions, or even new digital infrastructures. On another hand, they invest in the development of new types of products, business solutions, e.g., to be more interactive or responsive, or even new types of art, e.g., pictures or music that are connected to NFTs (Non-Fungible Tokens) and NFA (Non-Fungible Asset) solutions.

In order to increase the consumer's or buyer's interest, the technologies are constantly being further developed and adapted. This is mainly through behavioral- and psychological analysis but also digital tracking or new digital infrastructures, e.g., streaming, blockchain, virtual worlds, or Web3.

Companies are interested in more sales and to retain customers in the long term. External factors and perceptions have a strong influence on what customers do. Each professionally created and advertised product is equipped with chosen patterns, scenery, personality types and selected production techniques or music, defined specifically for each product or a product collection. The known and current approach is to retain customers through consistent branding and design and to get them used to products through mass advertising.

It is undeniable that every customer has their own preference. Depending on time, territory, and other factors, customers might love this or that. One likes the color blue, the other like a certain city, the other likes uniqueness, the next likes cheese or wine, some love one type of songs in the morning, another in the evening.

In U.S. Pat. No. 7,925,549, a personalized marketing architecture is described that uses real-time data and explicit customer input to augment marketing segmentation, analysis, and video advertisement delivery. Customer behavior, preferences, and intentions are monitored and identified to present real-time video messages. Real-time data may be collected based on the customer's data access permission profile to provide messages on an in-home personal portal or on out-of-home display devices to provide personalized messages in public spaces.

U.S. Pat. No. 9,846,883 provides for generating customized marketing messages using automatically generated customer identification data. In one embodiment, real-time data for a customer is received from a set of cameras associated with a retail facility to form detection data. The customer is automatically identified using the detection data to form customer identification data. Modular marketing messages form a personalized marketing message as a one-to-one customized marketing message specific to the customer.

There is a need for improved customized content data, e.g., for marketing and presentation, and to reach customers with tailored content.

SUMMARY OF THE INVENTION

The present disclosure relates to a method for generating and feeding a customized content data feed. The present disclosure relates further to a system and computer program for generating and feeding a customized content data feed. Furthermore, the present disclosure relates to a device for receiving the customized content data feed.

A computer implemented method generates and feeds a customized content data feed using a data management system. The method can include: providing a static content component; selecting a content variable to be used with the static content component; defining a channel for customized content data; and feeding the customized content data to the channel, wherein the customized content data is generated from the static content component and the dynamic content component by adding the dynamic content component to the static content component.

The method can alternatively or additionally include: providing one or more dynamic content components; selecting a content variable to be used with the dynamic content components; defining a channel for customized content data; and feeding the customized content data to the channel, wherein the customized content data is generated from the dynamic content components.

In general, the method can support generating and streaming customized content data.

The static content component can include two or more static components.

The static content component can be a defined static content component, which can be two or more static predefined components or elements.

The dynamic content component can include two or more dynamic components.

The dynamic content component can be a defined dynamic content component, which can be two or more static or dynamic components or elements.

Static and dynamic components or dynamic and dynamic components can be combined in various ways and used to feed tailored content data to the channel.

Adding the dynamic content component to the static content component can further include adding the dynamic content component based on a further content variable. If further to the selected content variable a further or second content variable is applied, then the content data can be further tailored and adjusted, which allows more variations to enrich the dynamic content component.

A content platform can be accessed when the dynamic content component is added to the static content component. The content platform can provide content instantly that can be used with the static content component, e.g., at the same time. The static content component may have a trigger and/or pointer built in to reference the dynamic content component in order to start the stream of feeding of the dynamic content component.

The customized content data as output may include various variable areas in the static and dynamic content components. This allows the output to be adapted and adjusted in an optimal way.

The selection of the content variable to be used with the static or dynamic content component can depend on the static or dynamic content component so that the static and dynamic or dynamic and dynamic content component match or fit to each other and achieve a higher acceptance.

If the dynamic content component is assigned based on the selected content variable by applying one or more data analytics, then a very well-suited dynamic content component can be identified and assigned. The analytics can be driven by an adapted algorithm or an artificial intelligence (AI) that helps, supports, or conducts a choosing of the dynamic content component. In one embodiment, a machine learning model can be used to choose the dynamic content component(s).

The dynamic content component can be generated by an AI. The content can be generated by the AI based on external inputs, e.g., known to AI from external or external functions. The AI may access content that the AI itself collected or is fed to the AI. This may apply to any content, wherever the content comes from. It can come from external feeds or feedings including impulses.

If the static content component includes a container to receive the dynamic content component, the container can be pre-set for the reception of the dynamic content component. The customized content data can then be generated while the dynamic content component remines flexible, and so the dynamic content component can be replaced or exchanged easily.

Two or more dynamic content components might be used or combined. This allows more flexibility for rendering effective output.

The content variable can define or identify a music track, a video, an image, an audio track, a text, a translation, a background, and/or a smell. The content variable may refer to voice over content, a movie, or a color. The content variable can indicate or points to a certain type of dynamic content component. Overall, the static and dynamic content components can be combined in various ways. Multiple dynamic content components can be combined with one static content component or alternatively, multiple dynamic content components can be combined.

Customized content data can be generated from the static content component and/or the dynamic content component by merging two or more content components to create feedable customized content data. The generation may include merging of two or more files or adding one file to another. This would allow to generate a pre-assembled data file or data feed to be streamed, transferred or transmitted. Alternatively, the static content component and the dynamic content or only dynamic content components can be assembled together in real-time and synchronized at the time of rendering of the customized content data on a device in an application. Two or more streams can be running in parallel. The static content component may comprise a synchronization trigger for rendering the customized content data substantially at the same time. For example, the dynamic content can include music that accompanies static content that includes video.

Individual content usage can be analyzed and taken into consideration when a channel for the customized content data is defined. This allows for a more precise definition of the channel or channels.

When feeding of the customized content data to the channel is responsive to previous content data, then an association with the content that is preferred can be established and used.

If the customized content data is fed to the channel, it can trigger a counter such that usage is detected. This can be advantageous to various applications including data rights management and synchronization.

A time length of the rendered customized content data can be measured on a device. The length may give an indication of whether the rendering or play counts.

According to a further aspect, a user device can receive a customized content data feed generated and fed to the user in any way or to a device. The customized content data can be rendered on the device, e.g., in a specific application or applications, in a browser, or otherwise as defined by settings. One or more feeds or streams can advantageously be combined in real-time on the device or application.

A further aspect of the present disclosure relates to a system for generating and feeding a customized content data feed. The system comprises a data management system connectively coupled to at least a device such as an end-user device. The data management system may be connected to multiple devices or a group of devices that have been defined or selected. In another embodiment the device or devices are chosen randomly.

A computer program for generating and feeding a customized content data feed comprising instructions which, when the computer program is executed by a data management system in a system environment, cause the data management system to carry out the steps of the disclosed method.

A non-transitory computer-readable medium can be encoded with instructions that cause a data management system to perform any of the methods disclosed.

The present disclosure and described techniques allow for a better and more effective advertising and communication through digital or other messages such as, for example, content (e.g., commercials, notes or news). Static content components, e.g., brand related digital content, and dynamic content components, e.g., music tracks, videos, footage, and colors, can be combined through automated and predefined procedures. Data processing and identification through algorithms or an artificial intelligence can provide the relevant information to bring the static content components and dynamic content components effectively together such that recipients enjoy the customized content data and build confidence in the static content components.

Dynamic content components can include, for example: a music or music track; a dynamic audio track with a speaker, including optional text overlay that may also include translation in an audio file, as well as in a text overlay; a color; and a background. Dynamic content may also include a smell in the case of end-user devices able to emanate, transmit, model, simulate, or stimulate smells.

The static content and the dynamic content can be stored and/or transmitted in a centralized or decentralized manner.

A method can be performed by one or more computers, each computer having at least one processor and a memory. The method can include: receiving from a user through a computer user interface a selection of video advertising content chosen for rendering on a plurality end-user devices, each of the end-user devices being operated by a respective end-user; determining a set of one or more characteristics associated with the selected video advertising content; and for each end-user device: determining a set of one or more characteristics associated with the respective end-user of the end-user device; applying artificial intelligence to select audio content for playback along with the video advertising content based on: the set of one or more characteristics associated with the respective end-user of the end-user device, and the set of one or more characteristics associated with the selected video advertising content; causing the end-user device to render the video advertising content to the respective end-user on a user interface of the end-user device; causing the end-user device to access the audio content from an audio streaming service; causing the end-user device to play back the accessed audio content for the end-user; and synchronizing playback of the video advertising content and the audio content for the end-user on the end-user device.

The method can further include, for the each end-user device: selecting an audio voice over track from a plurality of available voice over tracks to be played back during the rendering of the video advertising content; and synchronizing playback of the selected voice over track with playback of the video advertising content and the audio content for the end-user on the end-user device.

The audio voice over track can be selected based on the set of one or more characteristics associated with the respective end-user of the end-user device.

The audio voice over track can be selected by applying artificial intelligence.

The set of one or more characteristics associated with the respective end-user can include advertising-related personal profile characteristics.

The solutions according to the present disclosure can be combined as desired and further improved by the following embodiments that are advantageous on their own in each case. Unless specified to the contrary, the embodiments can be readily combined with each other.

A skilled person will easily understand that all features of the present disclosure may be implemented in a system or device and may be implemented as and/or constitute steps of a method and/or computer program according to the present disclosure.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

Figure 1:
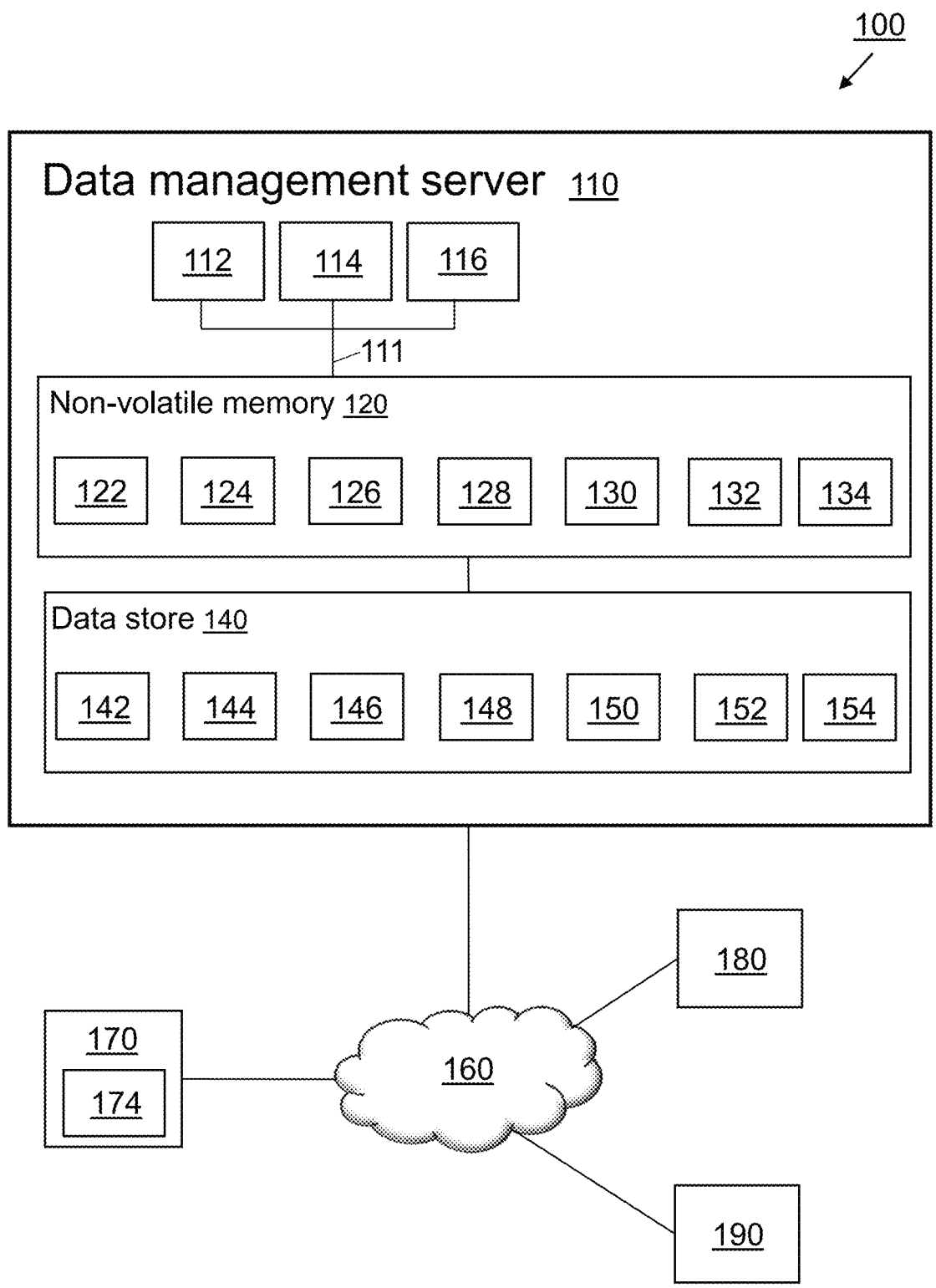
FIG. 1 is an exemplary architectural diagram of a system with a data management server, a client device and further devices configured to implement exemplary embodiments of the present disclosure.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Overview

A system can be configured to generate customized content data suitable for marketing, advertising, or campaigns. The customized content data can be feedable or can be streamed to devices, such as end user devices. The customized content data can include a static content component, e.g., referring to a product, such as a car, or a service, and a dynamic content component, e.g., a product version, such as a color of the car. The customized content data can alternatively include a static content component and one or more dynamic content components, e.g., a music or music track selected to be combined with the static content component. Two or more components can be combined at the time of rendering the customized content data on an end-user device. The customized content data can also be generated for streaming or transferring to the end-user device.

Campaigns, advertisements, a news note, a message, or a presentation with customized content data on social media, digital TV, a browser, or through any front end creates a strong or stronger bond with its user or consumer. For example, if a presented new product or service is accompanied by individualized music, voice, color etc. or combination of such dynamic content that the user likes or likes most, then the connection with the product or service can be increased and intensified. The same is true for unique content. In that way, any content or content relevant components can be tailored to individual users or people in a targeted and individual manner. This increases acceptance and may generate more sales while retaining customers in the long term. It may also increase attention, trust, appreciation, awareness, focus, and may indicate, suggest, and stimulate next steps of action such as to buy or value something, even in long term, connected or bound to a brand.

An interactive presentation, interactive product, or interactive message can be used advantageously, e.g., though the combination of image and text or audio and text and image. Such content can be produced and subsequently traded or packaged into a non-fungible token (NFT) and then further traded. An NFT is a non-interchangeable unit of data stored on a blockchain, a digital ledger. It adds uniqueness, verifiability, and credibility to any form of digital content or art, thereby safeguarding the creator's work and stopping duplication. For example, a meme can be converted into an NFT that can easily trade its ownership with other interested parties. The customized content data can contain an NFT, i.e., the static content component and/or the dynamic content component can comprise an NFT.

The customized content data can comprise an NFT or can be integrated, associated with, or linked into an NFT. The customized content data can be converted into an NFT.

For example, memes are considered social media tools with immense capacity to go viral and entertain people. NFT technology can be used to transform memes from a mere mode of presenting humorous content and can add uniqueness and unique value.

Example Embodiments

FIG. 1 shows an exemplary system 100 for generating and feeding customized content data. As shown in FIG. 1, in one implementation, the system 100 is configured to include an end-user device 170 that is in communication with a data management server 110 over a network 160. The device 170 can be a personal computer, laptop computer, or other type of electronic device, such as a mobile phone, smart phone, or tablet for receiving customized content data feeds. The device 170 may be smart glasses to render customized content data. The output may not only appear visually but can also take place acoustically or simulated by a chip. In one implementation, for example, the device 170 is coupled to I/O devices (not shown) that may include a keyboard in combination with a point device such as a mouse for using the device 170 to receive and send data via the network 160 to the data management server 110. The device 170 can include a user interface 174. The device can be configured to receive from and send information to the data management server 110. In one implementation, the user interface 174 may be part of a web browser (not shown), which allows a user to receive customized content data or customized content data feeds from the data management server 110. Communication between the user interface 174 of the device 170 and the data management server 110 may utilize one or more networking protocols, which may include HTTP, HTTPS, RTSP, or RTMP.

Although one access device 170 is shown in FIG. 1, the system 100 can support multiple end-user devices. The network 160 can include various devices such as routers, servers, and switching elements connected in an Intranet, Extranet or Internet configuration, or any type of network. Various data transfer types and interfaces are possible including a Neuralink interface or other brain-computer interfaces. The transfer may also be provided via a telepathy-like channel.

In some implementations, the network 160 uses wired communications to transfer information between the device 170 and the data management server 110. In another implementation, the network 160 employs wireless communication protocols. In yet other implementations, the network 160 employs a combination of wired and wireless technologies.

As shown in FIG. 1, in one implementation, the data management server 110, may be a special purpose server, and preferably includes a processor 112, such as a central processing unit (CPU), random access memory (RAM) 114, input-output devices 116, such as a display device (not shown), and non-volatile memory 120 and a data store 140, all of which are interconnect via a common bus 111 and controlled by the processor 112.

In one implementation, the non-volatile memory 120 can be encoded with instructions that cause the processor to implement an input module 122, a variable module 124, an assignment module 126, an analytics module 128, a content module 130, a license module 132, and a rendering or feed module 134. Further modules can be implemented and applied.

The input module 122 receives a static content component, but also user's data from the user's device 170 or other sources. Received user data, from the user interface 174 may be but is not limited to data in one or more unstructured text fields, unstructured or structured textual description, a string of data, and may contain information such as use of content or other relevant information. The information received may relate to a playlist of the user. As used herein, the phrase "received user data" is used interchangeably with input data, user's data or user's input. In one implementation, the user's data is transferred through the network 160 from the user device 170 to the data management server 110.

As shown in FIG. 1, in one implementation, the data store 140 is configured to include a static content component store 142, a user data store 144, an assignment store 146, an analytics store 148, a content store 150, a license store 152, and a rendering or feed data store 154. Further stores or platforms 180, 190 can be used, whereas the data store or each individual data store can be internal as well as external to the data management server 110.

The static content component store 142 includes static content components received from the input module 122. These static content components may be received from internal or external sources or servers in any format suitable for further processing and merging with further content components. Each static content component may be processed to allow to add or merge other content components. The static content component can be adapted to be rendered with a dynamic content component, preferably simultaneously or substantially at the same time.

The user data store 144 includes data, i.e., user's input, received by input module 122. In another implementation, the user's data may also be stored locally (not shown) on the user's device 170 or externally in a data store (not shown). The assignment store 146 includes determined assignments processed by the assignment module 126. The analytics store 148 includes analysis that has been processed by the analytics module 128. This may include user's input, but also identified users, behaviors, devices, etc. and is driven by an algorithm or an artificial intelligence (AI). The content store 150 can be internal or external and can store various contents including but not limited to music, videos, images. The content store 150 can be external, e.g., 180, and can refer to a distributor, such as Spotify™, iTunes™, TikTok™ or for example Universal Music Group or Sony Group.

In a further implementation, a content platform can be used to provide the respective content. A license store 152 includes stored licenses and reflects rights to be used and compensated. The rendering or feed data store 154 includes the generated customized content data for distribution as determined by the rendering or feed module 134. An exemplary rendering representation may be customized content data in the form of a video, image, image collection (e.g., gif), audio, or combination with individualized music as a dynamic content component. In another implementation, the customized content data may be a defined background or image with a dynamic content component such as a voice or a translation voice. The customized content data can be streamed to the device 170 or to multiple devices, e.g., in the same area or region, but also to an identified user group. The feed or stream can include the customized content data as a static content component and one or more dynamic content components. In one embodiment, the static content component and the dynamic content component can be brought together at the device 170 for rendering or running in parallel.

The data management server 110 and/or the device 170 can be configured to provide an ON/OFF feature, i.e., whether or not customized content data is fed and/or streamed. The server 110 may provide the customized content data only during certain days, times, regions etc. On the same token, a user may want to receive the customized content data during specific times, for a certain duration, or at specific locations. The ON/OFF feature can be individualized, e.g., based on information processed by the analytics module 128.

A data protection switch can be applied and implemented to address the protection of data privacy and compliance.

The dynamic content component may influence the volume, e.g., of a particular piece or sequence of music. The data management server 110 can define and control the volume, e.g., by an intelligent volume control. In a further embodiment, the volume may be dependent on the device 170, e.g., where the device is located or how customized content data is used in the very moment of streaming the customized content data.

A stream of the customized content data to the device 170 may be device dependent, e.g., whether the device is a mobile device or a PC for example. The customized content data may be chosen based on the device type.

Figure 2:
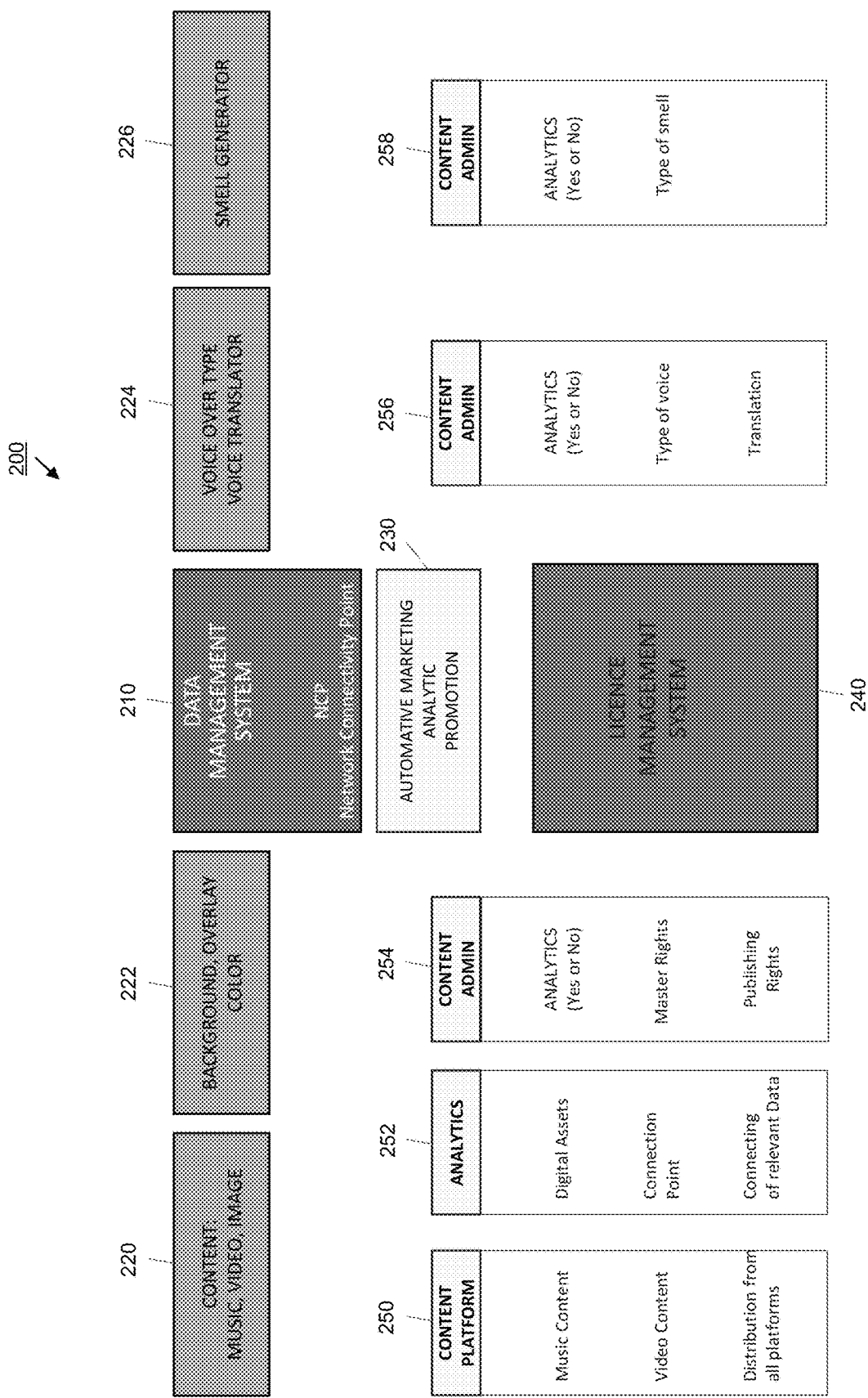
FIG. 2 is an exemplary environment diagram of the present disclosure.

FIG. 2 shows an exemplary environment diagram of the present disclosure. The exemplary environment 200 supports and enables the generation, feeding and output of customized content data and can be applied in connection with the system 100 as in FIG. 1. Shown are a data management system 210, a marketing analytic entity 230, and a license management system 240. The environment 200 comprises a first content entity 220, a second a content entity 222, a third content entity 224, and a fourth content entity 226. The environment 200 comprises further at least one content platform entity 250, an analytic entity 252, and respective content administration entities, such as a first content administration entity 254, a second content administration entity 256, and third content administration entity 258.

The data management system 210 provides for network connectivity point (NCP) to receive, process, and interpret data from users or user groups including play lists or preferences for further processing through the analytic entity 252.

The license management system 240 manages clearances or approvals of content. The marketing analytic entity 230 runs an artificial intelligence unit to determine by use of machine learning which static content components should be combined with which dynamic content component or multiple dynamic content components.

A selected content variable may point to one of the first to fourth content entities 220-226. The first content entity 230 provides audio (e.g., music, sound, voice), video or images for example. The second content entity 222 provides backgrounds or overly colors. The third content entity 224 provides a voice over type or a voice translator. The fourth content entity 226 provides for a smell that for example might be very effective in a perfume or food campaign.

The content platform entity 250 provides audio (e.g., music sound voice), video, or image content and is adapted for distribution. The analytic entity 252 connects relevant data, e.g., from digital assets and connection points. The first content administration entity 254 may include analytics for master- and publishing-rights. The second content administration entity 256 includes analytics for type of voice and translations. The third content administration entity 258 includes analytics for a type of smell. The content entities 220-226 may or may not use analytics as indicated in the figure.

The content can be provided in a centralized or decentralized form. Blockchain-applications or systems might be applied to verify traceability.

Figure 3:
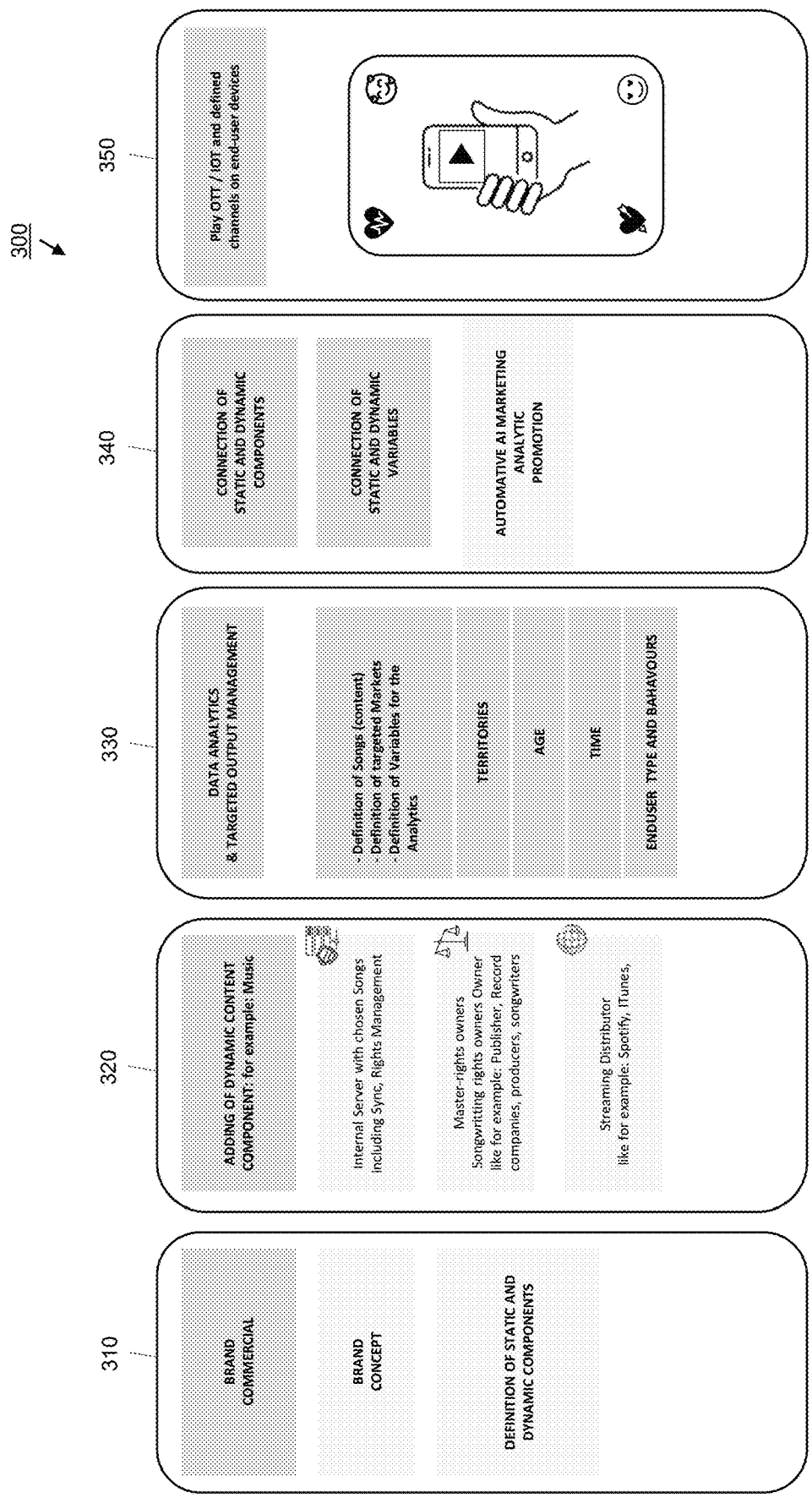
FIG. 3 is a block diagram of exemplary units according to exemplary embodiments of the present disclosure.

FIG. 3 shows a block diagram of units or modules according to exemplary embodiments of the present disclosure. The diagram 300 shows a first unit 310, a second unit 320, a third unit 330, a fourth unit 340, and a fifth unit 350.

The first unit 310 can define the static and dynamic content components, with one or more dynamic content components. In particular, the static content component, which may refer to a commercial, can be defined. The static content may refer to content such as a video or image of a certain product. The second unit 320 adds a dynamic content component, for example, a particular music track or audio signal. The dynamic content can be supported by an internal or external server 110, 180, 190 with chosen songs including sync and rights management. The songs or music tracks can be directly provided and streamed to the device 170 by a streaming distributor like Sportify™, iTunes™. The rights of master-rights owners, songwriting rights owners, and owners like for example publishers, record companies, producers, songwriters are considered when dynamic content components are added. The third unit 330 can provide data analytics and a targeted output management. A definition of songs, a definition of targeted markets, a definition of variables for the analytics, but also for territories or regions, age, time, and user behaviors can all be considered. The fourth unit 340 can provide for the connection or merging of the static and dynamic content components to the customized content data. The units can be supported by the marketing analytic entity 230.

The fifth unit 350 refers to the end-user device 170 to which the customized content data is fed or streamed. This may be achieved via a predefined channel. The channel may refer to social media, like TikTok™, Facebook™, Instagram™, or a video streaming provider like YouTube™, but also news or any other website that allows to render the customized content data. An over-the-top (OTT) media service is a media service offered directly to viewers via the Internet. It is noted that connecting OTT and Internet of things (IoT) has some attractive potential, especially in an increasingly competitive environment. Connecting OTT and IoT means being able to share data between an OTT service and IoT devices, enabling them to communicate with each other autonomously without human interaction for the benefit of the user's content experience.

A user who is configuring the customized content data or even an end user can also add weighting factors or emphasize factors, e.g., 1 for classical music, 2 for jazz, 3 for pop, 4 for dance, 5 for country, or the like. The numbers can be then considered when the dynamic content components are selected and added.

The configuring or end user may wish to select a source for the dynamic content component. The dynamic content component is then not necessarily selected and proposed by intelligence.

Figure 4:
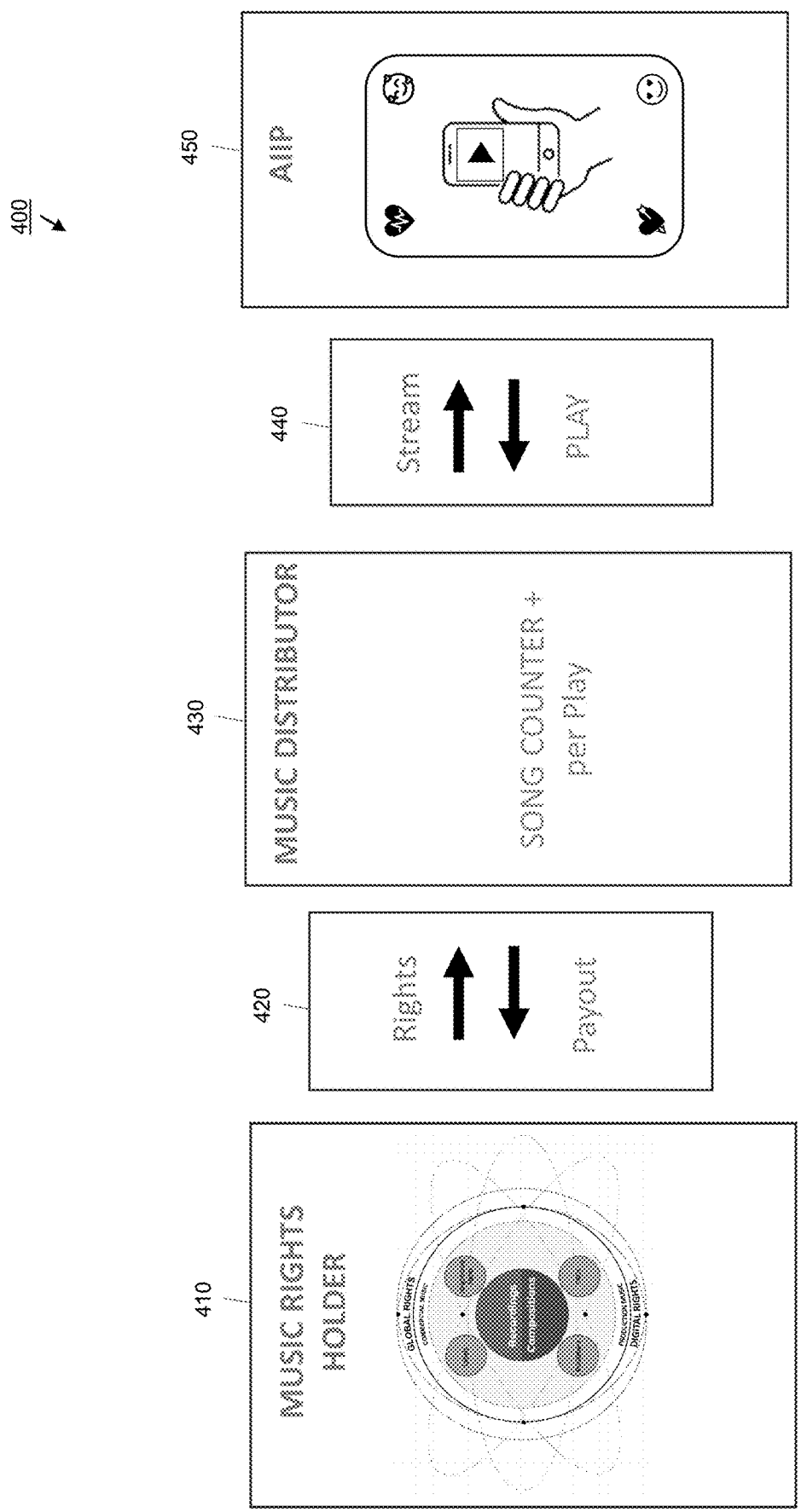
FIG. 4 is a schematic diagram illustrating a customized content data stream from a distributor to an end user device while considering rights and information flows.

FIG. 4 shows a schematic diagram 400 illustrating a customized content data stream from a distributor unit 430 to an end user device 450, such as device 170, while considering rights and information flows that are particularly relevant to the sync market where clearances and the processes are major hurdles. Sync or synchronization generally refers to music in advertising, film, games, news, messages, notes or any television or communication types or programs. A rights holder unit 410 is coupled via a rights/pay unit 420 to the distributor unit 430. FIG. 4 concentrates and focuses on the dynamic customized content data that is streamed via a communication unit 440 from the distributor unit 430 to the end user device 450 or application.

In one embodiment, the end user device 450 can be a brain-chip that is coupled to a brain-computer interface. Further, future bio-systems might become applicable. The communication unit 440 returns a play indication to the distributor unit 430. For example, when a song or music track of one customized content data feed is played more than, e.g., 30 second on the device 170, 450 then the song counter is increased by 1. The rights flow and payment via the rights/pay unit 420 can be streamlined and simplified. The rights holders are involved and considered in the entire process. An improvement to current complex workflows can be achieved.

In an implementation, a collision detection is applied. For example, if a dynamic content component is not available or not to be combined with a static content component, then the dynamic content component can be modified or removed. Replacement with another dynamic content component may be possible. An intelligent content filtering or muting may be performed by the data management server 110 or device app.

Figure 5:
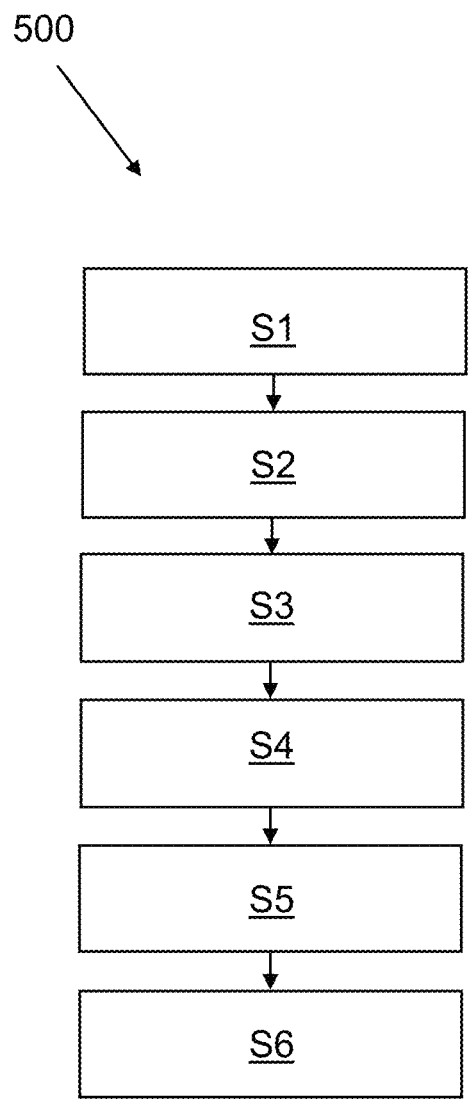
FIG. 5 is a flowchart illustrating a process implemented by an exemplary embodiment of the present disclosure for generating and feeding a customized content data feed.

FIG. 5 shows a flowchart illustrating an exemplary process 500 that can be implemented for generating and feeding a customized content data feed. Exemplary embodiments of the process 500 can create customized content data. The process can be implemented specifying one or more content variables. In exemplary embodiments, the process 500 can be executed to facilitate feeding customized content data to a channel.

The processor 112 can execute the process 500 to generate and feed customized content data to a channel. A channel is understood and referred to as social media, like TikTok™, Facebook™, Instagram™, or a video streaming provider like YouTube™, or even radio or any type of audio message but may also refer to news or any other website that allows to render the customized content data.

The process 500 may comprise various steps S1 to S6 as required and in any number and form desired to process content data. In step S1 a static content component is provided. The static content component can be in the form of a data file referring to a certain content or expression. In step S2 a content variable to be used with the static content component is selected. The content variable can define a music track, a video, an image, an audio track, a text, a translation, a background, and/or a smell. The content variable may refer to a voice over content, to a movie or a color. Considering the selection, in step S3 a dynamic content component based on the selected content variable is assigned, i.e., a particular music track can be used with the static content component or another dynamic component. Subsequently in step S4 customized content data is generated from the static content component and the dynamic content component by adding the dynamic content component to the static content component. Adding can mean to physically add or merge the static and dynamic content components. Adding the dynamic content component to the static content component can also be realized at the time of feeding or streaming to the device 170. Two or more dynamic content components can be added. Customized content data can be generated on the device 170 while the customized content data is rendered or shown. In step S5 a channel for the customized content data is defined. The channel may refer to a certain application or browser on a device 170 or a service through which the content is delivered to the end-user. In step S6 the customized content data is fed to the channel to be rendered on the device 170.

Figure 6:
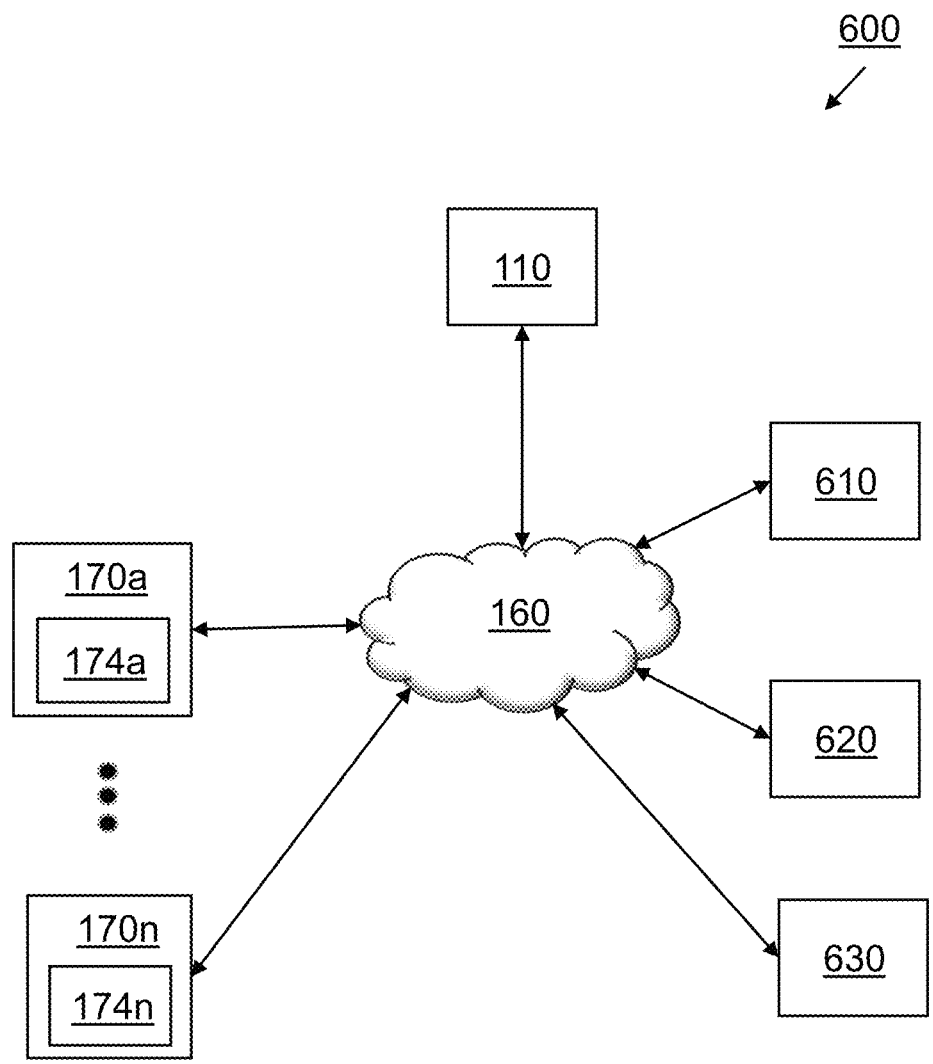
FIG. 6 is a further exemplary architectural diagram of a system with a data management server, multiple client devices and further devices configured to implement exemplary embodiments of the present disclosure.

FIG. 6 shows a further exemplary architectural diagram of a system 600 with the data management server 110, multiple client devices 170a-170n and further devices 610, 620, 630 configured to implement exemplary embodiments of the present disclosure.

The multiple client devices 170a-170n are in communication with the data management server 110 over the network 160. Each device 170a-170n is configured to include an interface, application, or frontend 174a-174n that is used to receive from and send information to the data management server 110 or any of the exemplary further devices 610, 620, 630. The further devices 610, 620, 630 may include a streaming distributor 610, a special content provider 620, and an analytics engine 630 or any other device that can support the present disclosure.

The data management server 110 coordinates the data flow from and to the client devices 170a-170n. The data management server 110 further may coordinate the data flow from and to the further devices 610, 620, and 630. The functions disclosed herein may also be provided in a more decentralized form or system, all to implement the various embodiments.

In general, the system that brings all the components together can be a standalone application, for example on a server, computer, device on any types of network environments that includes centralized and decentralized digital or bio network solutions. It can be a hybrid application or hybrid plugin added into any other system on any types of network environments that includes centralized and decentralized digital or bio network solutions. It can even exist and fully operate in any type of eco systems or environments such as Web3, virtual realities, or even future bio network solutions.

As alluded, all processes and methods disclosed could also happen online, e.g., exclusively on Web3 platforms, or the metaverse. Virtual worlds will be created there and all processes could be performed, assembled, and transferred to a digital location.

INDEX OF FIGURE REFERENCE NUMBERS 100 system
110 data management server
111 bus
112 processor
114 random access memory (RAM)
116 input-output devices
120 non-volatile memory
122 input module
124 variable module
126 assignment module
128 analytics module
130 content module
132 license module
134 rendering/feed module
140 data store
142 static content component store
144 user data store
146 assignment store
148 analytics store
150 content store
152 license store
154 rendering/feed data store
160 network
170 device
174 user interface
180, 190 further stores, platforms, or distributors
200 environment
210 data management system
220-226 content entities
230 marketing analytic entity
240 license management system
250 content platform entity
252 analytic entity
254-258 content administration entities
310-350 units
410 rights holder unit
420 rights/pay unit
430 distributor unit
440 communication unit
450 end user device
500 process 600 system
170a-170n multiple client devices with applications
174a-174n
610 streaming distributor
620 special content provider
630 analytics engine
S1-S6 steps

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by one or more computers, each computer having at least one processor and a memory, the method comprising:
receiving from a user through a computer user interface a selection of video advertising content chosen for rendering on a plurality of end-user devices, each of the end-user devices being operated by a respective end-user;
determining a set of one or more characteristics associated with the selected video advertising content; and
for each end-user device of the plurality of end-user devices:
determining a set of one or more characteristics associated with the respective end-user of the end-user device;
applying artificial intelligence to select audio content for playback along with the video advertising content based on:
the set of one or more characteristics associated with the respective end-user of the end-user device, and
the set of one or more characteristics associated with the selected video advertising content;
causing the end-user device to render the video advertising content to the respective end-user on a user interface of the end-user device;
causing the end-user device to access the audio content from an audio streaming service;
causing the end-user device to play back the accessed audio content for the end-user; and
synchronizing playback of the video advertising content and the audio content for the end-user on the end-user device.

2. The method of claim 1, further comprising, for the each end-user device:
selecting an audio voice over track from a plurality of available voice over tracks to be played back during the rendering of the video advertising content; and
synchronizing playback of the selected voice over track with playback of the video advertising content and the audio content for the end-user on the end-user device.

3. The method of claim 2, wherein the audio voice over track is selected based on the set of one or more characteristics associated with the respective end-user of the end-user device.

4. The method of claim 3, wherein the audio voice over track is selected by applying artificial intelligence.

5. The method of claim 1, wherein the set of one or more characteristics associated with the respective end-user comprises advertising-related personal profile characteristics.

6. A non-transitory computer readable medium having instructions stored thereon, wherein the instructions are executed by at least one computer processor and cause the at least one computer processor to perform a method comprising:
receiving from a user through a computer user interface a selection of video advertising content chosen for rendering on a plurality of end-user devices, each of the end-user devices being operated by a respective end-user;
determining a set of one or more characteristics associated with the selected video advertising content; and
for each end-user device of the plurality of end-user devices:
determining a set of one or more characteristics associated with the respective end-user of the end-user device;
applying artificial intelligence to select audio content for Playback along with the video advertising content based on:
the set of one or more characteristics associated with the respective end-user of the end-user device, and
the set of one or more characteristics associated with the selected video advertising content;
causing the end-user device to render the video advertising content to the respective end-user on a user interface of the end-user device;
causing the end-user device to access the audio content from an audio streaming service;
causing the end-user device to play back the accessed audio content for the end-user; and
causing the end-user device to synchronize playback of the video advertising content and the audio content for the end-user.

7. The computer readable medium of claim 6, wherein the method further comprises, for the each end-user device:
selecting an audio voice over track from a plurality of available voice over tracks to be played back during the rendering of the video advertising content; and
causing the end-user device to synchronize playback of the selected voice over track with playback of the video advertising content and the audio content for the end-user.

8. The computer readable medium of claim 7, wherein the audio voice over track is selected based on the set of one or more characteristics associated with the respective end-user of the end-user device.

9. The computer readable medium of claim 8, wherein the audio voice over track is selected by applying artificial intelligence.

10. The computer readable medium of claim 6, wherein the set of one or more characteristics associated with the respective end-user comprises advertising-related personal profile characteristics.

11. A computer system comprising at least one processor and a memory, wherein the memory has instructions stored thereon that are executed by the at least one processor and cause the computer system to perform a method comprising:

receiving from a user through a computer user interface a selection of video advertising content chosen for rendering on a plurality of end-user devices, each of the end-user devices being operated by a respective end-user;
determining a set of one or more characteristics associated with the selected video advertising content; and
for each end-user device of the plurality of end-user devices:
- determining a set of one or more characteristics associated with the respective end-user of the end-user device;
- applying artificial intelligence to select audio content for playback along with the video advertising content based on:
  - the set of one or more characteristics associated with the respective end-user of the end-user device, and
  - the set of one or more characteristics associated with the selected video advertising content;
- causing the end-user device to render the video advertising content to the respective end-user on a user interface of the end-user device;
- causing the end-user device to access the audio content from an audio streaming service;
- causing the end-user device to play back the accessed audio content for the end-user; and
- causing the end-user device to synchronize playback of the video advertising content and the audio content for the end-user.

12. The computer system of claim 11, wherein the method further comprises, for the each end-user device:
- selecting an audio voice over track from a plurality of available voice over tracks to be played back during the rendering of the video advertising content; and
- causing the end-user device to synchronize playback of the selected voice over track with playback of the video advertising content and the audio content for the end-user.

13. The computer system of claim 12, wherein the audio voice over track is selected based on the set of one or more characteristics associated with the respective end-user of the end-user device.

14. The computer system of claim 13, wherein the audio voice over track is selected by applying artificial intelligence.

15. The computer system of claim 11, wherein the set of one or more characteristics associated with the respective end-user comprises advertising-related personal profile characteristics.

* * * * *